United States Patent
Nouaille et al.

(10) Patent No.: US 9,981,884 B2
(45) Date of Patent: May 29, 2018

(54) METHOD FOR PRESERVING THE FERMENTABLE POTENTIAL OF AN ORGANIC SUBSTRATE AND CORRESPONDING FACILITY

(71) Applicant: AFYREN, Saint Beauzire (FR)

(72) Inventors: Régis Nouaille, Cournon d'Auvergne (FR); Jérémy Pessiot, Clermont-Ferrand (FR)

(73) Assignee: AFYREN, Saint Beauzire (FR)

( * ) Notice: Subject to any disclaimer, the term of this patent is extended or adjusted under 35 U.S.C. 154(b) by 1 day.

(21) Appl. No.: 14/912,565

(22) PCT Filed: Sep. 8, 2014

(86) PCT No.: PCT/FR2014/052220
§ 371 (c)(1),
(2) Date: Feb. 17, 2016

(87) PCT Pub. No.: WO2015/036683
PCT Pub. Date: Mar. 19, 2015

(65) Prior Publication Data
US 2016/0200635 A1 Jul. 14, 2016

(30) Foreign Application Priority Data

Sep. 11, 2013 (FR) .................................. 13 02119

(51) Int. Cl.
| | | |
|---|---|---|
| *C05F 3/00* | (2006.01) | |
| *C05F 5/00* | (2006.01) | |
| *C05F 7/00* | (2006.01) | |
| *C05F 9/00* | (2006.01) | |
| *C05F 11/00* | (2006.01) | |

(52) U.S. Cl.
CPC .................. *C05F 3/00* (2013.01); *C05F 5/00* (2013.01); *C05F 7/00* (2013.01); *C05F 9/00* (2013.01); *C05F 11/00* (2013.01); *Y02E 50/343* (2013.01); *Y02P 20/145* (2015.11); *Y02W 30/47* (2015.05)

(58) Field of Classification Search
CPC .... Y02E 50/343; Y02E 60/142; C12M 21/04; C12M 25/18; C12M 41/18; C12M 41/40; C12M 23/36; C12M 23/58; C12M 27/20; C12M 29/02; C12M 29/18; C12M 29/20; C12M 41/22; C12M 41/48; C12M 45/02; C12M 45/04; C05F 3/00; C05F 3/06; C05F 11/00; C05F 5/00; C05F 7/00; C05F 9/00; Y02P 20/145; Y02W 30/47
See application file for complete search history.

(56) References Cited

U.S. PATENT DOCUMENTS

| | | | | |
|---|---|---|---|---|
| 3,897,215 | A * | 7/1975 | Davidson, Jr. ............ | B03B 9/06 209/173 |
| 2006/0273048 | A1* | 12/2006 | Doyle ...................... | A01C 3/00 210/781 |
| 2013/0029394 | A1* | 1/2013 | Toll ......................... | A61L 11/00 435/167 |

FOREIGN PATENT DOCUMENTS

EP 0796832 * 4/2000

* cited by examiner

*Primary Examiner* — Debbie K Ware
(74) *Attorney, Agent, or Firm* — Dowell & Dowell, P.C.

(57) ABSTRACT

A process for preserving the initial fermentable potential of an organic substrate over time is presented. The method comprises a) determining the moisture content (HM) of the organic substrate, b) comparing the determined moisture content (HM) to a predefined moisture level (HD), c) storing only the organic substrate of which the moisture content (HM) determined in step a) corresponds to the predefined moisture content (HD), d) when a fermentable potential cannot be determined based on the moisture content (HM) alone during steps a) and c), taking measurements of the methanogenic potential of the biomass, e) comparing the measurements of the methanogenic potential of the biomass obtained during step c) to that of step a), and f) adapting the storage conditions to keep the moisture content (HM) of the organic substrate collected at a value that of the predefined moisture content (HD).

13 Claims, 2 Drawing Sheets

METHOD FOR PRESERVING THE FERMENTABLE POTENTIAL OF AN ORGANIC SUBSTRATE AND CORRESPONDING FACILITY

FIELD OF THE INVENTION

The present invention relates to a process for preserving the fermentable potential of an organic substrate and also to a corresponding facility.

BACKGROUND

The term "organic substrate" denotes herein waste, by-products and coproducts formed from organic matter, i.e. from biomass. The term "substrate" will subsequently be preferentially used.

The exploitation of such organic substrates resulting from human activities, whether they are domestic, industrial, agricultural or agro-industrial, can be implemented by means of fermentation processes. Depending on the purpose of the fermentation, the production of various metabolites is promoted, for example methane, hydrogen, volatile fatty acids, alcohols or the like. Processes for treating organic waste for the purpose of producing various metabolites are known, for example those described by EP-A-796 832, WO-A-2009/093 926 and WO-A-2011/120 035 in which a prior heat treatment of the organic matter is carried out, aimed at pasteurizing or sterilizing the organic matter in order to control the fermentation parameters.

The fermentable potential is a parameter used as an indicator of the effectiveness of a fermentation of a given biomass for producing metabolites, whatever the fermentative route implemented.

It proves to be the case that the fermentable potential rapidly evolves over time for fresh substrate which has not undergone any treatment. In other words, in the absence of treatment, the capacity of an organic substrate to produce metabolites decreases rapidly over time. This implies that the fresh substrate, which is generally relatively moist, whatever its nature, should be used rapidly. Typically, the use occurs within seven to fifteen days following collection, whether the fermentation is carried out in solid phase or in liquid phase, in order to preserve an optimal yield of metabolite production by fermentation.

As it happens, in the context of an industrial fermentation process, it is important, in order to guarantee the productivity of the facility, to have a substrate of which the fermentable potential is not only as high as possible, but especially regular and controlled. This point is all the more important since the substrates used in an industrial fermentation process are mainly of agricultural, industrial. domestic and/or food-processing origin in order to guarantee large volumes. As a result, qualitative and quantitative variability in the substrate, for example according to the season, is observed. By way of illustration, when farm animals, such as cattle, sheep or goats, are grazing outside, typically during the summer months, the production of dung and liquid manure is minimal. Likewise, green waste (clippings, leaves, etc.) are virtually nonexistent in winter. In other words, it is difficult to obtain a continuous and regular volume of a substrate of which the composition and the fermentable potential are controlled throughout the year. Indeed, it is generally accepted that storage of the substrate does not make it possible to maintain the fermentable potential of the substrate at desired values. In other words, it is accepted that rapid use of the substrate is necessary in order to preserve an optimal fermentable potential.

SUMMARY

The invention is aimed more particularly at overcoming these drawbacks by providing a process which makes it possible to maintain at a determined value, close to that of a fresh substrate, the fermentable potential of a substrate, whatever its composition and/or the collection date.

To this effect, a subject of the invention is a process for preserving the initial fermentable potential of an organic substrate over time, said potential being represented by the methanogenic potential of the biomass, or BMP, of the organic substrate, characterized in that it comprises at least the following steps:

a) determining the moisture content (HM) of the organic substrate collected, b) comparing the determined moisture content (HM) to a predetermined moisture content (HD) of between 0% and 40%, c) storing, under conditions limiting any activity of the microorganisms present in the substrate, and limiting any variation in the moisture content (HM), only the organic substrate of which the moisture content (HM) determined in step a) corresponds to the predetermined moisture content (HD), d) if necessary, during steps a) and c), taking measurements of the methanogenic potential of the biomass, e) comparing, if necessary, the measurements of the methanogenic potential of the biomass obtained during step c) to that of step a) and f) adapting the storage conditions to keep the moisture content (HM) of the organic substrate collected at a value that is equal, to within plus or minus 5%, to that of the predetermined moisture content (HD).

By determining the moisture content of the substrate and storing only that of which the moisture content corresponds to a predetermined moisture content, the fermentable potential of the substrate is, against all expectations, preserved, said substrate being, de facto, partially dry. A substrate thus partially dehydrated can be used more or less rapidly. It is thus possible to store the substrate in such a way as to smooth out the amount of available substrate over time, thus ensuring regularity of metabolite production.

According to advantageous but non-obligatory aspects of the invention, such a process may comprise one or more of the following characteristics:

The predetermined moisture content (HD) is advantageously between 5% and 25%.

The predetermined moisture content (HD) is preferentially between 8% and 12%.

If, in step a), the determined moisture content (HM) is higher than the predetermined moisture content (HD), the organic substrate is dehydrated, during an additional step g), until the predetermined moisture content (HD) is obtained.

During step c), during storage, steps a) and b) are for example regularly carried out.

Before step a), draining of the organic substrate is carried out during an additional step h).

During step a), the moisture content (HM) is determined by means of a measurement taken on a representative sample of the organic substrate collected.

During step a), the moisture content (HM) is determined visually on the organic substrate collected.

The invention also relates to a facility for carrying out a process in accordance with one of the preceding characteristics, characterized in that it comprises at least:
- an organic substrate feed member,
- an organic substrate discharge member,
- at least one methane and/or temperature sensor and
- an organic substrate storage member.

According to advantageous but non-obligatory aspects, such a facility may comprise the following characteristics:
- It comprises a dehydration member.
- The dehydration member comprises a member for recovering a part of the heat produced by a heat production process, for example a process associated with fermentation or with combustion of a metabolite.
- A member for packaging the dehydrated substrate, prior to storage thereof, is provided.
- A carbon dioxide and/or moisture sensor.

BRIEF DESCRIPTION OF THE DRAWINGS

The invention will be understood more clearly and other advantages thereof will emerge more clearly on reading the description of several embodiments of the invention, given by way of nonlimiting example and produced with reference to the following drawings in which.

DETAILED DESCRIPTION

Figure 1:
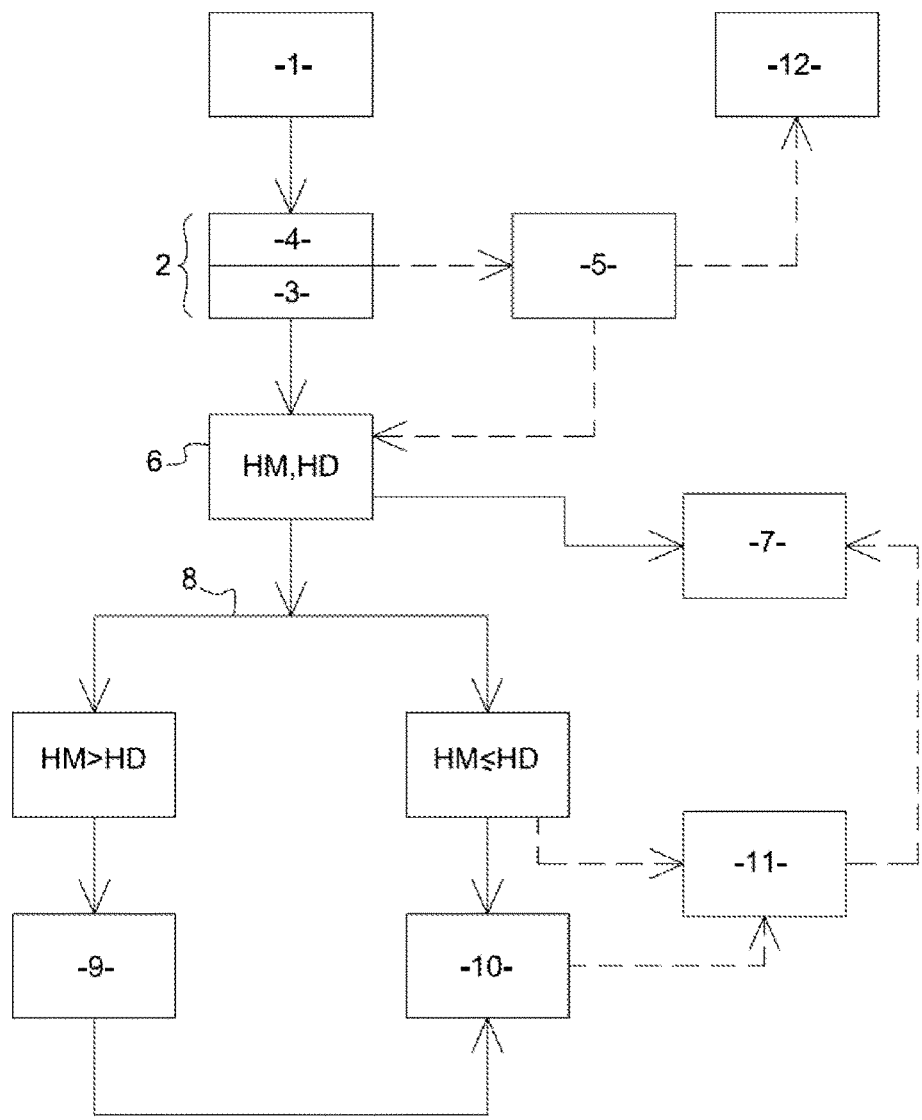
FIG. 1 is a simplified diagram representative of the process which is the subject of the invention.

One of the fermentations carried out is methanization, i.e. the production of methane by means of an anaerobic fermentative process comprising four interconnected steps: a first step concerns the hydrolysis of the complex molecules present in the substrate by microorganisms. A second step, involving acidogenic microorganisms, makes it possible to convert the monomers resulting from the hydrolysis into volatile fatty acids, into alcohols, into organic acids, into hydrogen and into carbon dioxide. Microorganisms are involved respectively in the step of formation of hydrogen, acetate and methane precursors in an acetogenesis step. A final step is the production of methane by the action of archaebacteria.

Depending on the initial substrate, and therefore on the constituent biomass of the organic waste, the characteristics of the various methanization steps evolve, it being understood that the groups of microorganisms act simultaneously. These characteristics will determine the capacity of a substrate to produce methane: the methanogenic potential of the biomass, commonly denoted by the acronym BMP (Biochemical Methane Potential), is thus determined in a known manner.

This potential illustrates not only the capacity of the biomass to produce methane, but also constitutes a parameter representative of the capacity of the substrate to produce other metabolites by fermentation. The methanogenic potential can therefore be used, like other parameters, as an indicator of the fermentable potential of the substrate. As a result, the applicant has retained the measurement of the BMP as being a measurement representative of the general fermentable potential of a substrate, it being understood that it is possible to use other parameters to monitor the evolution of the fermentable potential during the implementation of the invention.

The applicant has noted, surprisingly, that the fermentable potential is preserved when the activity of the microorganisms is slowed down, i.e. limited, in particular owing to a water content of the substrate 2, therefore a moisture content HM of between 0% and 40%, advantageously between 5% and 25%, and preferentially between 8% and 12%. Such a predetermined moisture content HD is generally lower than the initial water content and therefore than the determined moisture content HM of the fresh substrate 2.

It is acceptable that it is advisable to use the substrate as rapidly as possible, with a moisture content HM as close as possible to a moisture content which is defined and known per se, according to the fermentation process retained, and which is generally greater than 40%, in order to obtain an optimal fermentable potential. In other words, a moisture content of between 0% and 40% is considered, in the prior art, to be too low to allow optimal operation of a fermentation process. Tests carried out with two types of cattle dung, liquid manure from cattle and poultry droppings gave the following BMP values, expressed in a unit known per se, namely in $Nm^3/T$ of crude material:

Dung 1, fresh: 50. Dung 1, 3 months of storage: 12. Dung 1, 1 year of storage: 8.

Dung 2, fresh: 54. Dung 2, 3 months of storage: 14. Dung 2, 1 year of storage: 8.

Liquid manure, fresh: 13.5. Liquid manure, 3 months of storage: 4.

Droppings, fresh: 51. Droppings, 3 months of storage: 14.

Tests carried out on the same substrates 2 and for the same storage times as previously were carried out. A batch of substrate 2 was dehydrated by heating at 105° C. and another batch was dehydrated by heating at 60° C. In the two cases, a predetermined moisture content HD of advantageously between 8% and 12%, in the case in point in the region of 10%, is achieved in approximately four hours when the substrate 2 is heated at 105° C. for dungs and in approximately twenty hours when the substrate 2, with the exception of the liquid manures, is heated at 60° C. A moisture content HM in the region of 0% is achieved in eighteen hours with a substrate 2 of liquid manure type heated at 105° C. and in forty-eight hours for all the substrates 2 of liquid manure type heated at 60° C., knowing that, for the dungs and droppings, the content is achieved in a little more than twenty-four hours. In other words, and logically, the predetermined moisture content HD is achieved more rapidly at high temperatures.

After dehydration, to a moisture content of 10%, of the substrates 2 heated at 60° C. and at 105° C., the applicant took measurements of the BMP after a storage period of three months and, for certain substrates 2, of one year. Thus, a comparison, under the same conditions, of the fermentable potential of the substrates is carried out.

The results of these BMP measurements are reproduced hereinafter:

Dung 1, 60° C.: 3 months: 52.5 one year: 42.
Dung 1, 105° C.: 3 months: 45.5 one year: 39.
Dung 2, 60° C.: 3 months: 50 one year: 41.5.
Dung 2, 105° C.: 3 months: 44 one year: 39.
Droppings, 60° C.: 3 months: 62.
Droppings, 105° C.: 3 months: 50.
Liquid manure, 60° C.: 3 months: 14.
Liquid manure, 105° C.: 3 months: 10.5.

It is noted, surprisingly, that a substrate 2, whatever it is, heated at 60° C. has a BMP, and therefore a fermentable potential, which is not only close to the initial fermentable potential indicated in the first table, after three months of storage, but in all cases higher than that of the substrate heated at 105° C. In this case, the term "close" should be understood as denoting both a slightly lower value and a slightly higher value. Furthermore, the fermentable potential of the substrate 2 heated at 60° C. is only approximately 20% lower, after one year of storage, compared with the fermentable potential of the fresh substrate 2.

The substrate 2 heated at 105° C. has, surprisingly, a fermentable potential below that observed for the substrate 2 heated at 60° C., this being for all the storage times. Nevertheless, the substrates 2, whatever the dehydration temperature, typically for a temperature of between 50° C. and 120° C., have a fermentable potential above that of the substrate 2 which has not been dehydrated.

It therefore appears that moderate heating, in order to dehydrate a substrate, is an optimal solution for preserving a high fermentable potential. Indeed, it has been noted that, at a temperature of 105° C., the initiation phase, in methanogenic fermentation, is longer than at 60° C.

On the basis of these results, the applicant provides a process for preserving the fermentable potential of an organic substrate. The process which is the subject of the invention is described with reference to FIGS. 1 to 3.

A step prior to the implementation of the process which is the subject of the invention consists in collecting 1 the substrate 2. This involves essentially fermentable organic matters or biomasses derived from domestic or agricultural by-products or coproducts, in particular from the rearing of mammals such as cattle, sheep, goats or pigs or poultry. The waste originating from industry or from agribusiness, in particular from the dairy, market-garden or fruit industry, are also collected.

This substrate comprises a solid phase 3 and/or a liquid phase 4. The nature and/or the origin of the substrate 2 are variable and known per se. An optional step consists, when the substrate has a low load, i.e. when the moisture content is more than 80%, in carrying out a draining 5, which is preferably natural. The objective of this draining 5 is to discharge the surplus liquid phase. It corresponds, de facto, to a period of pre-storage of the substrate, prior to the implementation of the process.

A first step consists, for each arrival of substrate 2 or on the drained substrate, in determining the moisture content HM of the substrate. For this, a visual determination is possible, in particular when the moisture content HM is very low or, conversely, very high. In another embodiment, a sample 6 representative of the substrate 2 is taken and the moisture content HM, therefore the percentage of solids, of the substrate 2, is determined by measurement on the sample. The sampling and the method for measuring the moisture content HM are known per se. It is understood that, if the substrate 2 is used immediately, typically within seven to fifteen days following collection, in a fermentation process 7, known per se, or after a draining phase 5 if required, and optionally once the fermentable potential has been determined, it is not necessary to carry out the other steps of the process.

On the other hand, if the substrate 2 is not used rapidly, i.e. within a period of seven to fifteen days after collection 1, depending on the initial moisture content HM and the storage conditions, a loss of the fermentable potential is observed. By way of example, tests carried out on the substrate 2 made up of cattle dungs and liquid fertilizers have shown, through the monitoring of the BMP, a fermentable potential which, for certain substrates, is reduced at least four-fold after three months of storage on a platform or in a field, the substrate being neither sheltered nor covered.

A subsequent step 8 of the process consists in comparing the determined moisture content HM to the previously predetermined moisture content HD which, in the case in point, is between 8% and 12%. In any event, this moisture content to be achieved HD is chosen to correspond to a value of the BMP that is as close as possible to the value of the initial BMP, on fresh substrate.

If the determined moisture content HM is higher than the predetermined moisture content HD, then, during an additional step 9, the substrate 2 is dehydrated so as to reduce the moisture content HM by a defined value, corresponding to the moisture content HD to be achieved. The value of this dehydration 9, i.e. the difference between the determined initial moisture content HM and a predetermined final moisture content HD, depends, on the one hand, on the initial moisture content and, on the other hand, on the final moisture content making it possible to preserve a fermentable potential as close as possible to the fermentable potential of the fresh substrate.

If the determined moisture content HM is similar to the predetermined moisture content HD, i.e. HM=HD, no action is taken, and the substrate 2 is stored as it is in a storage member 10. In any event, the storage conditions are adapted to keep the moisture content (HM) of the substrate at a value that is equal, to within plus or minus 5%, to the predetermined moisture content (HD), this being in order to take into account the constraints of the application of the process on an industrial scale and to limit the variations in moisture content (HM). As a variant, the substrate 2 is not stored, but is used directly, it being understood that this means use within seven days following its collection 1.

If the determined moisture content HM is lower than the predetermined moisture content HD, i.e. HM<HD, the substrate 2 is stored as it is, in the knowledge that it will still always be rehydrated 11 prior to its use in a fermentation process 7. As previously, the substrate 2 can be used directly, after rehydration 11. The rehydration can be direct or indirect when the dehydrated substrate is mixed with a non-dehydrated substrate.

When the determined moisture content HM must be lowered, i.e. when HM>HD, which is generally the case given the composition of the substrates 2 commonly encountered, a controlled dehydration 9 of the substrate 2 is carried out. The techniques used are known per se and are chosen according to the nature of the substrate 2 and/or the solids content to be achieved. As a matter of interest, air-drying may be used, with natural ventilation or forced ventilation. The latter technique is generally, and naturally, accompanied by draining 5. The dehydration can also be carried out by forced draining 5, i.e. by mechanical pressing. It should be noted that the draining 5 can be carried out before the first step a) of determining the moisture content HM if it is known that, by virtue of its composition, the substrate 2 collected has a moisture content HM higher than the predetermined moisture content HD.

The dehydration 9 is advantageously carried out by heating. It can be carried out continuously or batchwise, in a drying cell such as the one used in the wood industry, for hay or for cereals. The dehydration 9 can, if required, be total, using known techniques, for example using techniques such as lyophilization, i.e. sublimation under pressure, or pervaporation by passing the substrate over a hydrophilic membrane.

In any event, it is necessary to directly or indirectly rehydrate 11 a substrate having a moisture content HM equal to, or at least close to, the predetermined moisture content HD before its use in a fermentation process in which the moisture content is known per se and is generally greater than 40%.

The water extracted from the substrate can, if required, be stored 12 for possible rehydration of the substrate or used for agricultural and/or industrial needs such as fermentation processes, irrigation or the culture of microorganisms. As a variant, the water can be either retreated in a waste water treatment plant or discharged in the form of steam into the atmosphere when the dehydration 9 is carried out by providing heat.

When, in an advantageous embodiment, a heat source is used to provide the heat required for the dehydration 9, a heat source linked to a process linked to a fermentation is advantageously used. In particular, a part of the heat resulting from a methane cogeneration or combustion process is used as heat source serving to dehydrate the substrate 2. In other words, a part of the excess or free heat produced during the fermentation process is used to dehydrate the substrate.

The storage of the substrate 2, advantageously carried out in a dry and ventilated environment, generates a regular determination, for example by taking samples, of the moisture content HM. This is because, not only is it advisable to avoid any uncontrolled rehydration 11 of the substrate that may induce a decrease in the fermentable potential, through the occurrence of fermentation of the stored substrate, but it is also advisable to avoid any undesired increased desiccation of the substrate. It is understood that, if required, measurements and comparisons of the methanogenic potential of the substrate during storage and/or at the time of collection of the substrate are carried out. By way of example, the various steps of the process are again carried out, on a sample of substrate, every month in the knowledge that the storage time may be at least one year, as illustrated by the tests carried out by the applicant. In fact, the storage time is adapted according to the requirements for substrate and can therefore be more than one year.

Two types of facilities for implementing the process which is the subject of the invention are now described with reference to FIGS. 2 and 3.

In all cases, dehydration members known per se and advantageously used in the agriculture, forestry or food-processing field are used. As a result, these members will not be described in greater detail, similarly to the devices for sampling and measuring the relative moisture which are also known per se.

Figure 2:
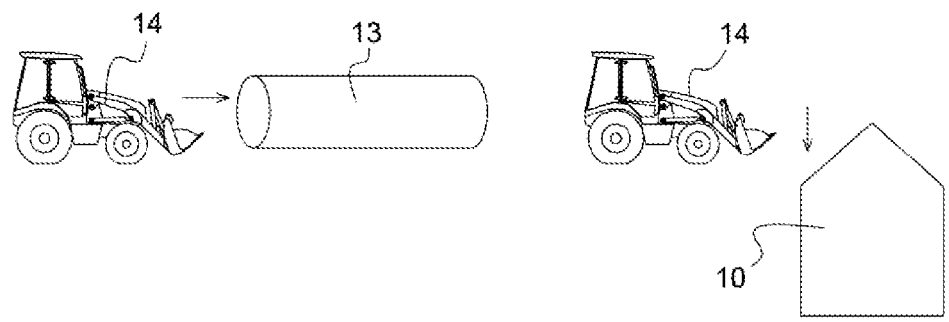
FIGS. 2 and 3 are simplified diagrams representative of two installations for carrying out the process according to two embodiments.

In a first embodiment illustrated in FIG. 2, the facility makes it possible to dehydrate 9, in batchwise mode, a substrate 2. With such a facility, the substrate feed and/or output of a dehydration member 13 is batchwise. Such a facility, which is easy to use, is particularly suitable for preparing the storage of amounts of substrate of between, for example, 500T and 10 000 T, typically for excess substrate 2 not used immediately.

The dehydration member 13 is, for example, a drier of rotary type such as a hay drier. Heat is supplied to this drier, from a heat source known per se, and water and heat are extracted from the drier. The loading and unloading of the drier is carried out in a known manner, for example the members for feeding and discharging the substrate 2 are formed by an agricultural machine 14 equipped with a loading bucket. Typically, such a drier makes it possible to lower below 40% the moisture content of 50 T to 1000 T of substrate 2, in a few days, namely in less than eight days. The storage takes place in premises 10, which are advantageously ventilated, forming a storage member. In other embodiments, the dehydration 9 is carried out naturally or by means of another known technique.

Figure 3:
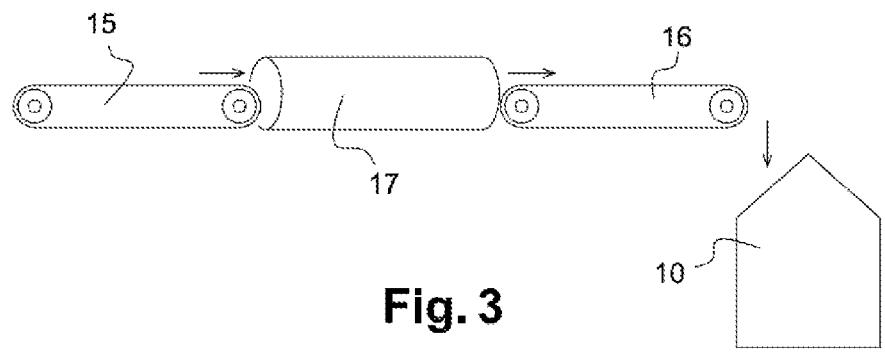

In the facility shown in FIG. 3, the substrate 2 feed and discharge members each comprise, respectively, a conveyor belt 15, 16 which continuously feeds and discharges the substrate 2. The latter is dehydrated in a dehydration member, advantageously a continuous countercurrent dehydration member 17.

It is understood that the conveyor belt 16 feeds the dehydrated substrate 2 directly into storage premises 10, out of water. Automatic sensors, not shown, for the hygrometry of the storage premises 10 can advantageously be programmed to take regular measurements of the moisture content. Thus, it is possible to verify, indirectly, the stability of the moisture content HM of the substrate 2. If the hygrometry level of the closed storage premises 10 increases, this indicates a probable rehydration of the stored substrate. Likewise, it is possible to provide sensors in the storage premises 10 which make it possible to verify that the stored substrate does not ferment, but remains stable and dehydrated. For this, methane sensors and/or a temperature probe can for example be used. Carbon dioxide and/or moisture sensors can also be used.

In one embodiment, not shown, the dehydrated substrate is packaged in an opaque and leaktight plastic film, in a manner similar to the film used to produce silage. In this case, the substrate can be stored in open premises, typically in a hangar.

In addition to optimization of metabolite production by controlling the amount and the quality of the substrate, having a constant and controlled moisture content of the substrate makes it possible to preserve the amount of metabolites produced. By way of example, a metabolite production multiplied by 3.5 to 5 was observed with treated substrate compared to nontreated substrate, stored respectively for between 3 and 12 months, i.e. levels of preservation of the fermentable potential of a treated substrate, that has been stored, after 3 and 12 months, greater than 70% of that of a fresh substrate.

The invention claimed is:

1. A process for preserving the initial fermentable potential of an organic substrate over time, said potential being represented by the methanogenic potential of the biomass, or BMP, of the organic substrate, characterized in that it comprises at least the following steps:
   a) determining the moisture content (HM) of the organic substrate collected,
   b) comparing the determined moisture content (HM) to a predetermined moisture content (HD) of between 0% and 40%,
   c) storing, under conditions limiting any activity of the microorganisms present in the substrate, and limiting any variation in the moisture content (HM), only the organic substrate of which the moisture content (HM) determined in step a) corresponds to the predetermined moisture content (HD),
   d) when fermentable potential cannot be determined based on the moisture content (HM) alone, during steps a) and c), taking measurements of the methanogenic potential of the biomass,
   e) when fermentable potential cannot be determined based on the moisture content (HM) alone, comparing the measurements of the methanogenic potential of the biomass obtained during step c) to that of step a) and
   f) adapting the storage conditions to keep the moisture content (HM) of the organic substrate collected at a value that is equal, to within plus or minus 5%, to that of the predetermined moisture content (HD).

2. The process as claimed in claim 1, characterized in that the predetermined moisture content (HD) is between 5% and 25%.

3. The process as claimed in claim 2, characterized in that the predetermined moisture content (HD) is between 8% and 12%.

4. The process as claimed in claim 1, characterized in that, if, in step a), the determined moisture content (HM) is higher than the predetermined moisture content (HD), the organic substrate is dehydrated, during an additional step g), until the predetermined moisture content (HD) is obtained.

5. The process as claimed in claim 1, characterized in that, during step c), during storage, steps a) and b) are regularly carried out.

6. The process as claimed in claim 1, characterized in that, before step a), draining of the organic substrate is carried out during an additional step h).

7. The process as claimed in claim 1, characterized in that, during step a), the moisture content (HM) is determined by means of a measurement taken on a representative sample of the organic substrate collected.

8. The process as claimed in claim 1, characterized in that, during step a), the moisture content (HM) is determined visually on the organic substrate collected.

9. A facility for carrying out a process in accordance with claim 1, characterized in that it comprises at least:
   an organic substrate feed member (14; 15),
   an organic substrate discharge member (14; 16),
   at least one methane and/or temperature sensor and
   an organic substrate storage member (10).

10. The facility as claimed in claim 9, characterized in that it comprises a dehydration member (13; 17).

11. The facility as claimed in claim 10, characterized in that the dehydration member (13; 17) comprises a member for recovering a part of the heat produced by a heat production process, said process associated with at least one of fermentation and combustion of a metabolite.

12. The facility as claimed in claim 9, characterized in that a member for packaging the dehydrated substrate, prior to storage thereof, is provided.

13. The facility as claimed in claim 9, characterized in that it comprises a carbon dioxide and/or moisture sensor.

\* \* \* \* \*